United States Patent
Kotecha et al.

(10) Patent No.: US 11,068,375 B2
(45) Date of Patent: Jul. 20, 2021

(54) SYSTEM AND METHOD FOR PROVIDING MACHINE LEARNING BASED MEMORY RESILIENCY

(71) Applicant: ORACLE INTERNATIONAL CORPORATION, Redwood Shores, CA (US)

(72) Inventors: Yagnesh Dilipbhai Kotecha, Pune (IN); Philippe Le Mouel, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/373,238

(22) Filed: Apr. 2, 2019

(65) Prior Publication Data
US 2020/0125385 A1   Apr. 23, 2020

(30) Foreign Application Priority Data
Oct. 17, 2018 (IN) .............................. 201841039402

(51) Int. Cl.
*G06F 9/46* (2006.01)
*G06F 11/34* (2006.01)
(Continued)

(52) U.S. Cl.
CPC ........ *G06F 11/3442* (2013.01); *G06F 3/0673* (2013.01); *G06F 9/45558* (2013.01);
(Continued)

(58) Field of Classification Search
CPC ............. G06F 11/0754; G06F 11/3003; G06F 11/0751; G06F 11/362; G06F 12/0238;
(Continued)

(56) References Cited

U.S. PATENT DOCUMENTS

| 9,460,008 | B1 * | 10/2016 | Leshinsky | G06F 12/0238 |
| 2005/0081190 | A1 * | 4/2005 | Betancourt | G06F 12/0253 717/124 |

(Continued)

OTHER PUBLICATIONS

Oracle, "Oracle Fusion Middleware Using WebLogic Server Multitenant: 11 Configuring Resource Consumption Management", © 2015, retrieved from http://www.oracle.com/webapps/redirect/signon?nexturl=https://docs.oracle.com/middleware/1221/wls/WLSMT/config_rcm.html#WLSMT1518 on Mar. 1, 2021, 10 pages.

*Primary Examiner* — Tuan A Vu
(74) *Attorney, Agent, or Firm* — Tucker Ellis LLP (57) ABSTRACT

In accordance with an embodiment, a service, application, or other component can operate in association with a virtual machine at a computer server or device. The system can determine memory heap usage based on collected metrics, via one or more push and/or pull communications of data, and automatically adjust or tune concurrent processing of registered components, in response to such determination. In accordance with an embodiment, the system is extensible to support different low memory conditions and different components that require tuning of their processes. Datasets describing information such as heap usage, garbage collection, and stuck threads, can be captured and stored; and machine learning processes applied to those datasets, to deduce new low memory conditions. If memory pressure continues to be high, and is not controlled by tuning component processes, the system can determine likelihood of a memory leak, and restart the server.

20 Claims, 10 Drawing Sheets

(51) Int. Cl.
*G06F 9/455* (2018.01)
*G06N 20/00* (2019.01)
*G06F 11/30* (2006.01)
*G06F 3/06* (2006.01)
*G06F 12/02* (2006.01)
*G06F 9/50* (2006.01)

(52) U.S. Cl.
CPC ...... *G06F 11/3037* (2013.01); *G06F 12/0253* (2013.01); *G06N 20/00* (2019.01); *G06F 9/50* (2013.01); *G06F 12/0246* (2013.01); *G06F 2009/45591* (2013.01)

(58) Field of Classification Search
CPC ............. G06F 12/0426; G06F 12/0253; G06F 3/0673; G06F 9/50; G06F 11/3442; G06F 11/3037; G06F 20/00; G06F 6/45558; G06F 2009/45591
See application file for complete search history.

(56) References Cited

U.S. PATENT DOCUMENTS

| | | | | |
|---|---|---|---|---|
| 2011/0283163 | A1* | 11/2011 | Zheng | G06F 11/362 714/763 |
| 2012/0210309 | A1* | 8/2012 | Jamison | G06F 12/0253 717/158 |
| 2012/0222005 | A1* | 8/2012 | Harris | G06F 3/0673 717/120 |
| 2014/0310235 | A1* | 10/2014 | Chan | G06F 11/3003 707/603 |
| 2015/0261649 | A1* | 9/2015 | Boehm | G06F 11/0754 714/47.3 |
| 2016/0070593 | A1* | 3/2016 | Harris | G06F 12/0253 718/106 |
| 2017/0322861 | A1* | 11/2017 | Chan | G06F 9/50 |
| 2017/0337138 | A1* | 11/2017 | Li | G06F 12/0246 |
| 2019/0391901 | A1* | 12/2019 | Gupta | G06F 11/0751 |

* cited by examiner

SYSTEM AND METHOD FOR PROVIDING MACHINE LEARNING BASED MEMORY RESILIENCY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to India Provisional Patent Application titled "SYSTEM AND METHOD FOR PROVIDING MACHINE LEARNING BASED MEMORY RESILIENCY", Application No. 201841039402 (TEMP/E-1/42659/2018-CHE), inventors Yagnesh Kotecha and Philippe Le Mouel, filed Oct. 17, 2018; which application is herein incorporated by reference.

FIELD OF TECHNOLOGY

Embodiments described herein generally relate to service-oriented architecture, cloud computing, or other computing environments, and are particularly directed to systems and methods for providing machine learning based memory resiliency in such environments.

BACKGROUND

In service-oriented architecture, cloud computing, or other computing environments, while executing a service, application, or other component, at a computer server, and as memory needs increase, an out-of-memory exception may result in a crash of the server.

In some environments, the system may be configured to observe, monitor or determine the memory heap over time, and provide a user with a notification of a low memory condition, so that the user can take action in response to that notification, for example by manually shutting down various services, applications, or other components. However, such an approach generally requires direct involvement by the user, to avoid a potential server crash.

SUMMARY

In accordance with an embodiment, described herein is a system and method for providing machine learning based memory resiliency, for use with service-oriented architecture, cloud computing, or other computing environments.

In accordance with an embodiment, a service, application, or other component can operate in association with a virtual machine at a computer server or device. The system can determine memory heap usage based on collected metrics, via one or more push and/or pull communications of data (e.g., heap usage, garbage collection, and stuck threads), and automatically adjust or tune concurrent processing of registered components, in response to such determination.

In accordance with an embodiment, the system is extensible to support different low memory conditions and different components that require tuning of their processes. Datasets describing information such as heap usage, garbage collection, and stuck threads, can be captured and stored; and machine learning processes applied to those datasets, to deduce new low memory conditions. If memory pressure continues to be high, and is not controlled by tuning component processes, the system can determine likelihood of a memory leak, and restart the server.

DETAILED DESCRIPTION

As described above, in service-oriented architecture (SOA), cloud computing, or other computing environments, while executing a service, application, or other component, at a computer server, and as memory needs increase, an out-of-memory (e.g., OutOfMemory) exception may result in a crash of the server. Traditional approaches to address this situation generally require direct involvement by the user to avoid a potential server crash.

In accordance with an embodiment, described herein is a system and method for providing machine learning based memory resiliency, for use with service-oriented architecture, cloud computing, or other computing environments.

In accordance with an embodiment, a service, application, or other component can operate in association with a virtual machine at a computer server or device. The system can determine memory heap usage based on collected metrics, via one or more push and/or pull communications of data (e.g., heap usage, garbage collection, and stuck threads), and automatically adjust or tune concurrent processing of registered components, in response to such determination.

In accordance with an embodiment, the system is extensible to support different low memory conditions and different components that require tuning of their processes. Datasets describing information such as heap usage, garbage collection, and stuck threads, can be captured and stored; and machine learning processes applied to those datasets, to deduce new low memory conditions. If memory pressure continues to be high, and is not controlled by tuning component processes, the system can determine likelihood of a memory leak, and restart the server.

In accordance with an embodiment, a technical purpose of the systems and methods described herein includes automatic adjustment or tuning of concurrent processing of registered components in a service-oriented architecture, cloud computing, or other computing environment, for example, to provide memory resiliency, and/or reduce the likelihood of out-of-memory exceptions. The described approach recognizes that:

Since low memory notifications may be associated with false alerts, the system can capture datasets that can be used to apply machine learning (ML) processes or techniques to deduce low memory conditions.

Slowing down of processing by registered components can be customized so that new components can be registered to be adjusted or tuned, and the registered components can provide full control over how to adjust or tune themselves when memory resiliency system triggers the components to slow down, based on low memory conditions triggered.

When memory pressure becomes low, the system indicates to registered components to recover back to a normal pace of processing.

Even after slowing processing, in cases where the memory pressure is high, still low memory conditions triggers for longer duration, and garbage collection (GC) processing time is continuously increasing more than, e.g., a value of "n" % of total processor (CPU) processing time by the virtual machine, then in such a situation, the system can consider it as a memory leak, and will restart the server.

In accordance with an embodiment, the system attempts to avoid out-of-memory (e.g., OutOfMemory) exceptions. In cases where memory pressure continues to be high and is not controlled by slowing processes, then the system will determine a likelihood of a memory leak, and trigger a server restart.

In accordance with various embodiments, the feature can be used with environments such as, for example, Oracle SOA Suite, Oracle Service Bus, Oracle Integration Cloud Service, Oracle Business Process Management (BPM), Oracle B2B, Oracle Enterprise Scheduler Service (ESS), Oracle Managed File Transfer (MFT), or other types of service-oriented architecture, cloud computing, or other computing environments.

Machine Learning Based Memory Resiliency System

Figure 1:
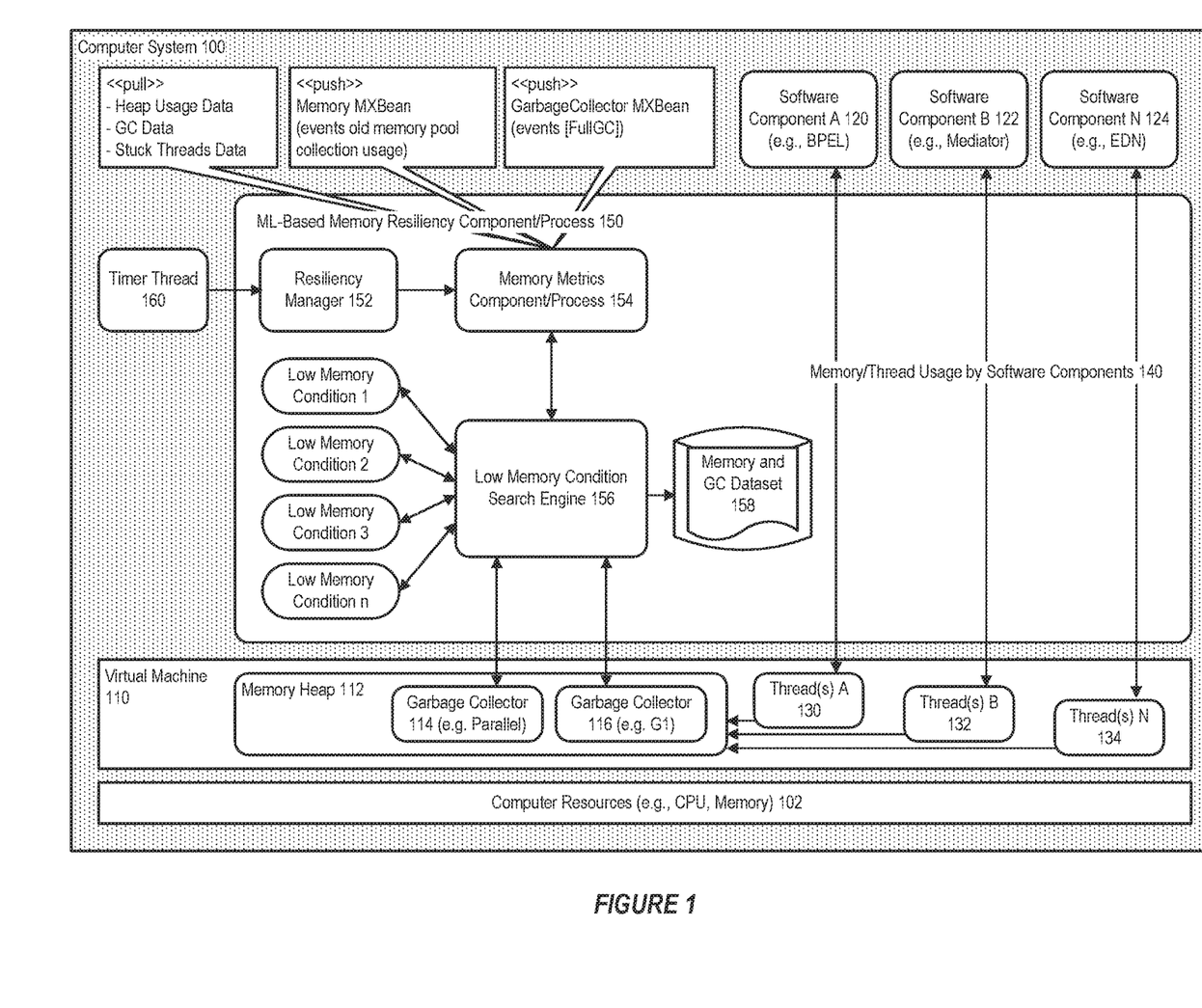
FIG. 1 illustrates a system that provides machine learning based memory resiliency, in accordance with an embodiment.

FIG. 1 illustrates a system that provides machine learning based memory resiliency, in accordance with an embodiment.

As illustrated in FIG. 1, in accordance with an embodiment, a computer system 100 or server, that can be provided as part of a service-oriented architecture, cloud computing, or other computing environment, can include a plurality of computer resources (e.g., processor/CPU, memory) 102. The system can also include one or more virtual machine 110 (e.g., a Java virtual machine, JVM), and memory heap 112, that enable execution of services, applications, or other components, within the computing environment.

In accordance with an embodiment, the virtual machine can be associated with one or more garbage collectors 114, 116, or garbage collection processes, that periodically garbage-collect unused memory space within the memory heap. Examples of the types of garbage collectors that can be used include a parallel garbage collector and/or a G1 garbage collector.

In accordance with an embodiment, one or more service(s), application(s), or other software component(s) A 120, B 122, N 124, such as for example, an Oracle Business Process Execution Language (BPEL) component, Oracle Mediator component, and/or Oracle Event Delivery Network (EDN) component, can operate in association with the virtual machine, for example by the virtual machine executing thread(s) A 130, B 132, N 134 that are associated with the software components and that utilize 140 the memory heap.

In accordance with an embodiment, the system includes a ML-based memory resiliency component/process 150, and is extensible to support different low memory conditions, and different registered components that require tuning of their processes. The system includes within or otherwise associated with the virtual machine, a resiliency manager component or process 152, that can be provided as software or program code executable by a computer system or other processing device. The resiliency manager component or process receives indications from a timer thread 160, and a memory metrics component or process 154 (memorymetrics_resiliency_manager), that can similarly be provided as software or program code executable by a computer system or other processing device, and that receives metrics data from or otherwise communicates with the virtual machine to gather metrics describing heap usage.

In accordance with an embodiment, computer readable datasets describing information such as heap usage, garbage collection, and stuck threads, can be captured and stored; and machine learning processes or techniques applied to those datasets, to deduce new low memory conditions.

In accordance with an embodiment, a low memory condition search engine 156 (low_memory_condition_search_engine) component or process, that can be provided as software or program code executable by a computer system or other processing device, can maintain a database of one or more memory and garbage collection dataset 158, and control a garbage collection process for use with the virtual machine and memory heap, for example a parallel garbage collection, or a G1 garbage collection process.

The above are provided by way of example and for purposes of illustration. In accordance with various embodiments, other types of garbage collectors can be used.

Figure 2:
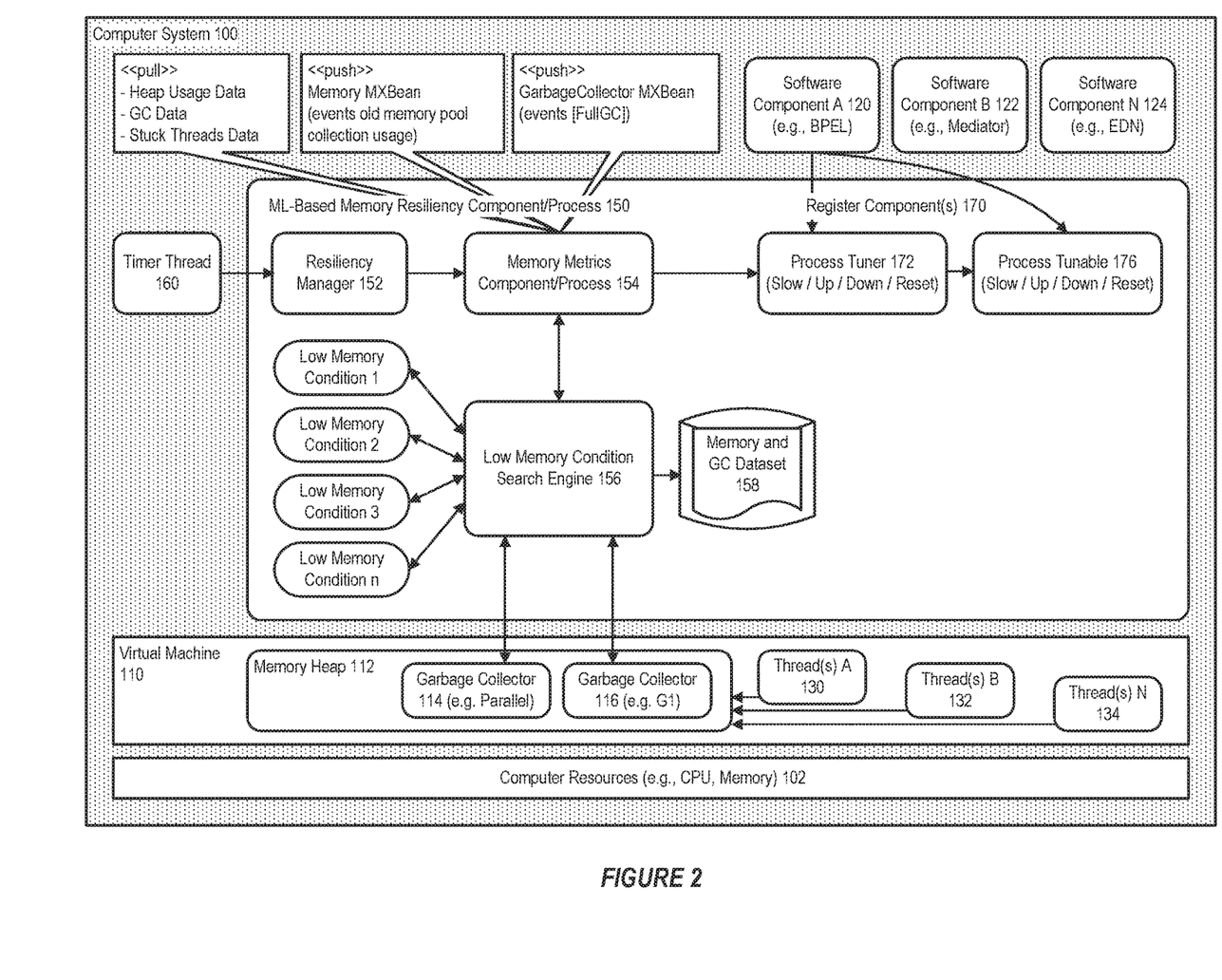
FIG. 2 further illustrates a system that provides machine learning based memory resiliency, in accordance with an embodiment.

FIG. 2 further illustrates a system that provides machine learning based memory resiliency, in accordance with an embodiment.

As illustrated in FIG. 2, in accordance with an embodiment, the system can determine memory heap usage, and automatically adjust or tune concurrent processing of registered components, in response to such determination.

In accordance with an embodiment, each software component can be registered 170 with a process tuner 172 component (process_tuner) that receives instructions from the memory metrics component or process, and communicates with a process tunable component 176 (process_tunable) to implement commands to slow, increase (up), reduce (down), or reset the amount of threads, and hence the processing rate, performed by the registered component in response to a determination by the low memory condition search engine of one or more low memory conditions, or that the low memory conditions are no longer present.

Figure 3:
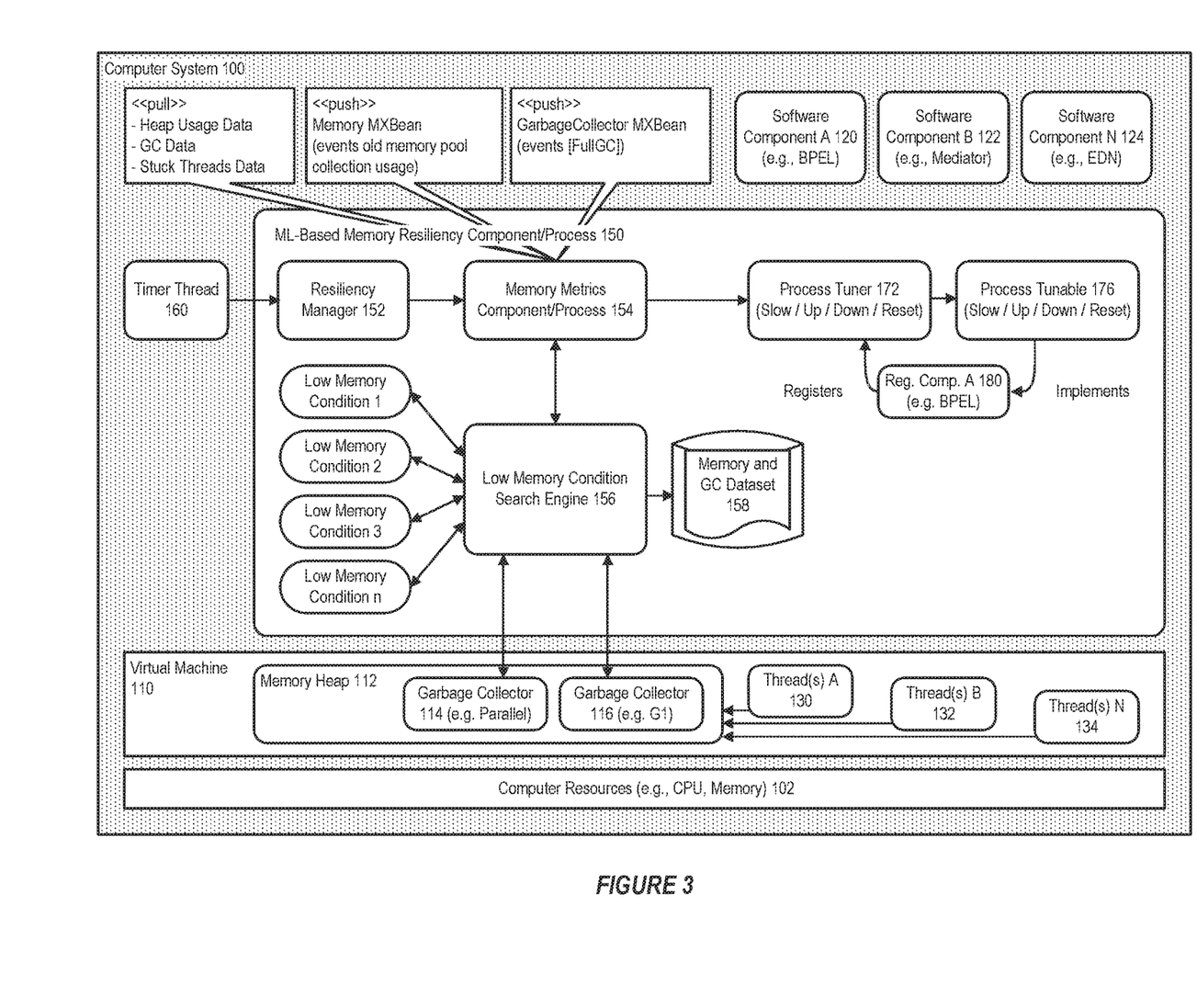
FIG. 3 further illustrates a system that provides machine learning based memory resiliency, in accordance with an embodiment.

FIG. 3 further illustrates a system that provides machine learning based memory resiliency, in accordance with an embodiment.

For example, in accordance with an embodiment, a registered component (e.g., A 120) such as, for example Oracle BPEL, or other types of components, can implement or otherwise be associated with a registration data 180 at the process tuner.

The process tuner in turn receives instructions from the memory metrics component or process, and communicates with the corresponding process tunable component to implement commands to slow, increase (up), reduce (down), or reset the amount of threads, and hence the processing rate, performed by a registered component (e.g., BPEL component), in response to a determination by the low memory condition search engine of one or more low memory conditions, or that the low memory conditions are no longer present.

The above are provided by way of example and for purposes of illustration. In accordance with various embodiments, other types of components can be registered.

Figure 4:
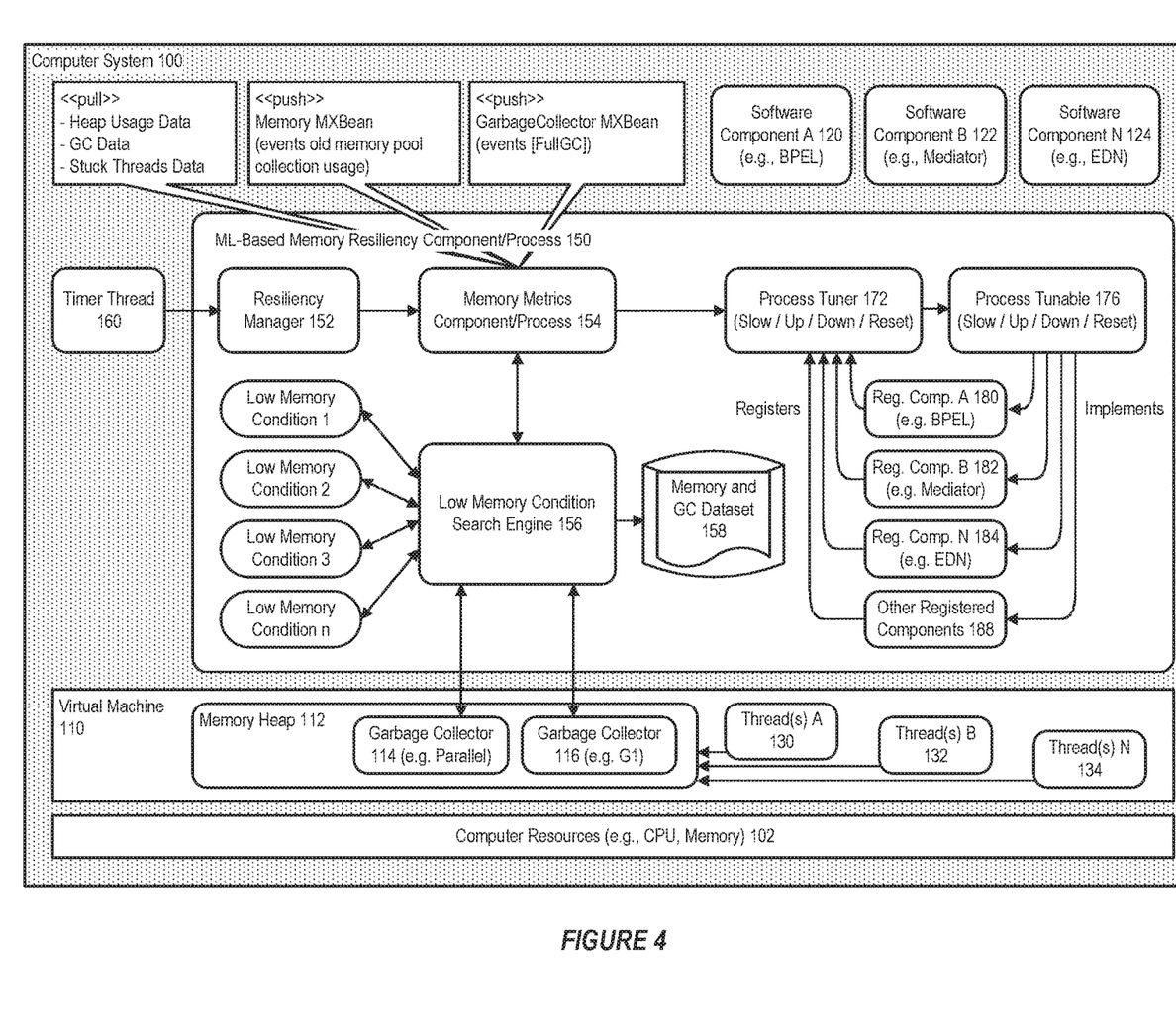
FIG. 4 further illustrates a system that provides machine learning based memory resiliency, in accordance with an embodiment.

FIG. 4 further illustrates a system that provides machine learning based memory resiliency, in accordance with an embodiment.

As illustrated in FIG. 4, in accordance with an embodiment, a similar process can be used with others of the one or more service(s), application(s), or other software component(s), so that a plurality of registered components (e.g., B (122), N (124)) likewise implement or are otherwise associated with a registration data 182, 184, 188 at the process tuner.

The process tuner in turn receives instructions from the memory metrics component or process, and communicates with the corresponding process tunable component to control the processing rate performed by each of those registered components), in response to a determination by the low memory condition search engine of one or more low memory conditions, or that the low memory conditions are no longer present.

The above are similarly provided by way of example and for purposes of illustration. In accordance with various embodiments, other types of components can be registered.

Figure 5:
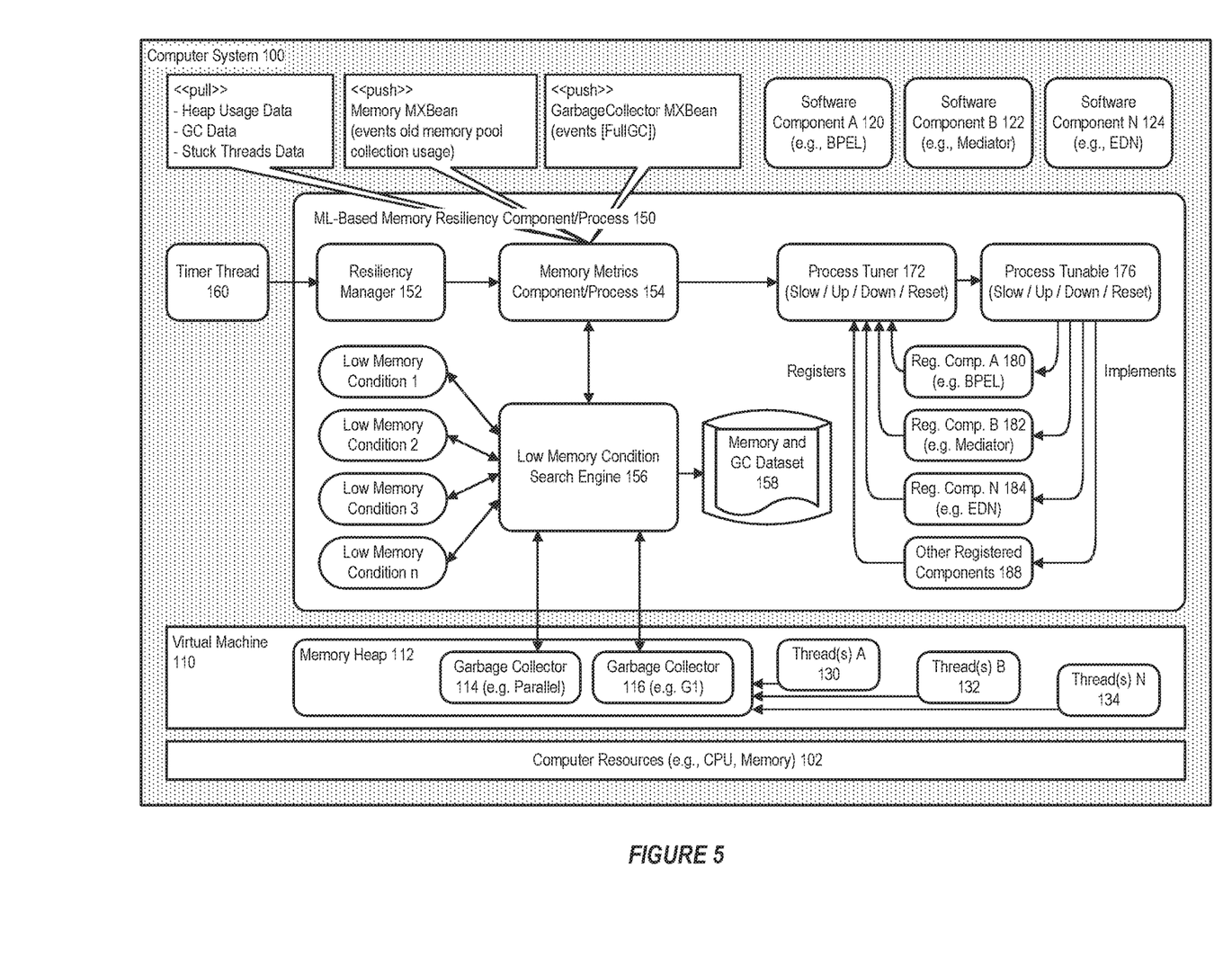
FIG. 5 further illustrates a system that provides machine learning based memory resiliency, in accordance with an embodiment.

FIG. 5 further illustrates a system that provides machine learning based memory resiliency, in accordance with an embodiment.

As illustrated in FIG. 5, in accordance with an embodiment, the resiliency manager component or process can receive, at the memory metrics component or process, a set of metrics data from one or more virtual machine indicative of memory heap usage, garbage collection processes, and other information, using either push and/or pull mechanisms.

For example, in accordance with an embodiment, the resiliency manager component or process can pull, from the virtual machine, information such as heap usage data; garbage collection data; and/or stuck threads data.

As another example, in accordance with an embodiment, can receive, via a push mechanism from, e.g., a Memory MXBean, events such as old memory pool collection usage.

As another example, in accordance with an embodiment, can receive, via a push mechanism from a GarbageCollector MXBean events related to, e.g., a full garbage collection.

The above are provided by way of example and for purposes of illustration. In accordance with various embodiments, other types of information can be received at the resiliency manager component or process, using various push and/or pull mechanisms.

Figure 6:
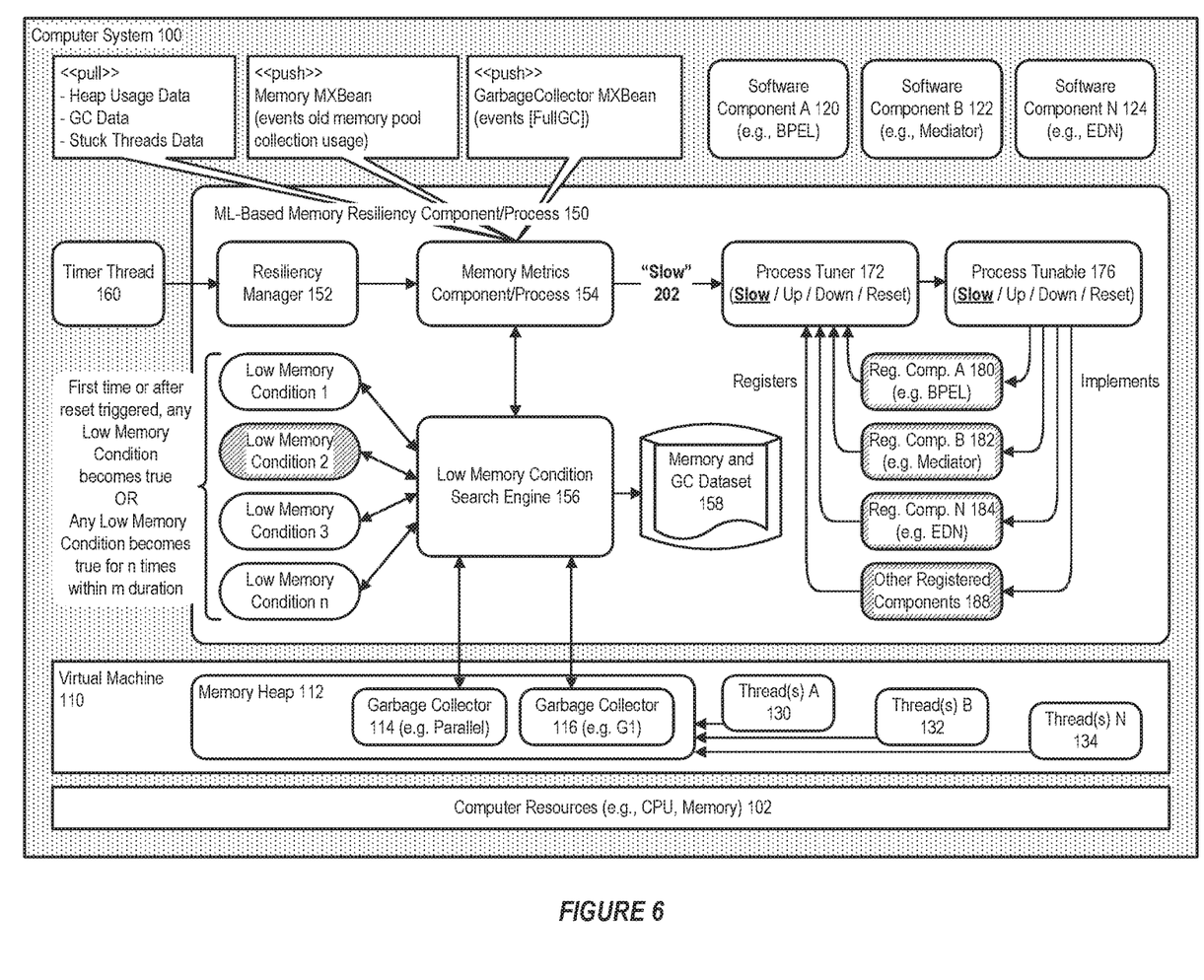
FIG. 6 further illustrates a system that provides machine learning based memory resiliency, in accordance with an embodiment.

FIG. 6 further illustrates a system that provides machine learning based memory resiliency, in accordance with an embodiment.

In accordance with an embodiment, when a first time or after a reset is triggered, any low memory condition becomes true; or any low memory condition becomes true a particular number of times/instances within a particular amount/period of time; the system can issue an instruction to slow the amount of threads associated with, and hence the processing rate performed by, a registered component.

For example, as illustrated in FIG. 6, in accordance with an embodiment, when a first time or after a reset is triggered, any low memory condition becomes true; or any low memory condition becomes true a particular number of "n" times/instances within a particular amount/period of time of "m" duration (in this example, Low Memory Condition 2, as indicated by shading); the system can issue an instruction to slow (202) the amount of threads associated with, and hence the processing rate performed by, a registered component.

Figure 7:
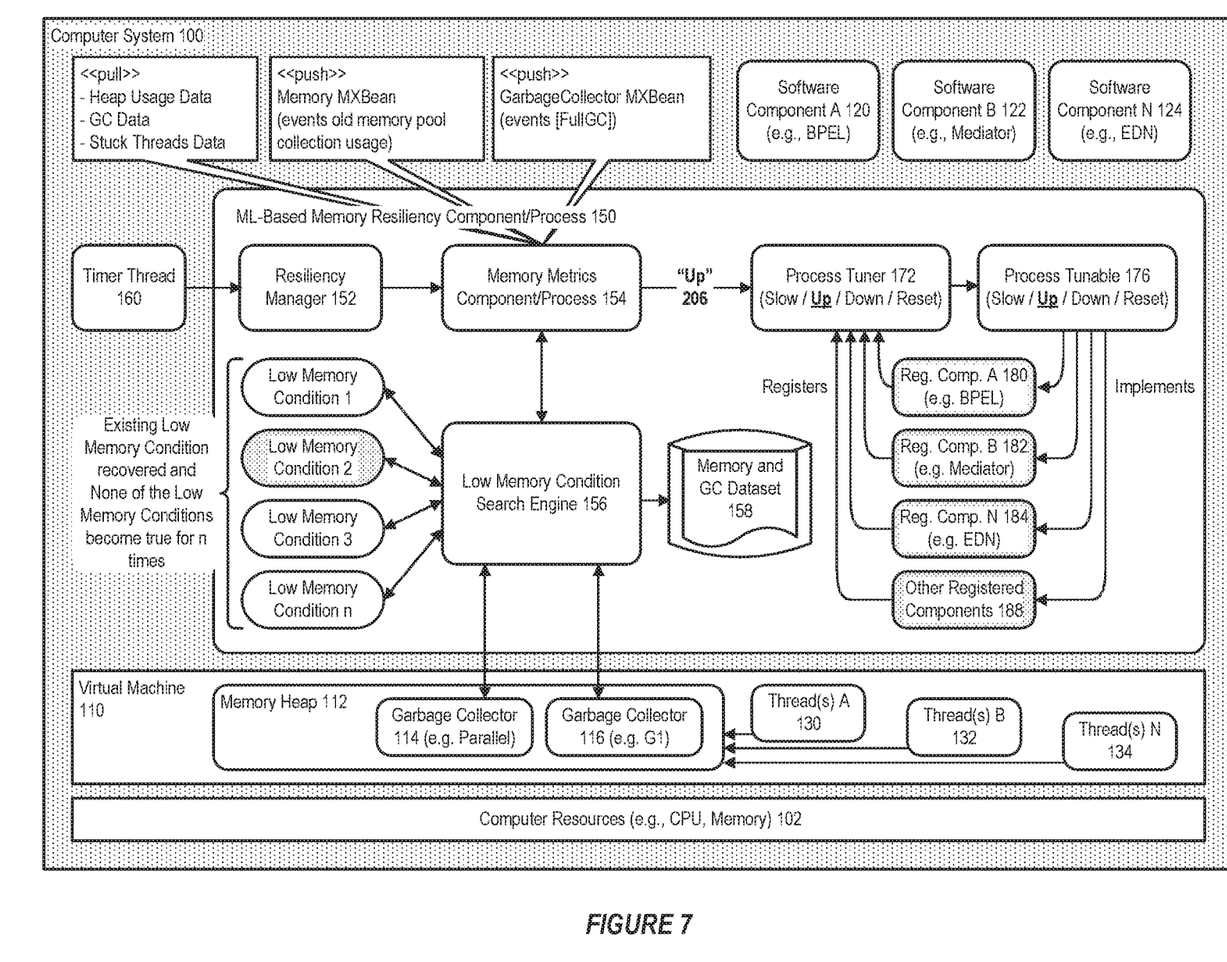
FIG. 7 further illustrates a system that provides machine learning based memory resiliency, in accordance with an embodiment.

FIG. 7 further illustrates a system that provides machine learning based memory resiliency, in accordance with an embodiment.

In accordance with an embodiment, when an existing low memory condition has recovered, and none of the low memory conditions becomes true for a particular number of times/instances within a particular amount/period of time; the system can issue an instruction to increase (up) the amount of threads associated with, and hence the processing rate performed by, a registered component.

For example, as illustrated in FIG. 7, in accordance with an embodiment, when an existing low memory condition has recovered (in this example, indicated by the differently-shaded Low Memory Condition 2), and none of the low memory conditions becomes true for a particular number of "n" times/instances (within a particular amount/period of time of "m" duration); the system can issue an instruction to increase (up) (206) the amount of threads associated with, and hence the processing rate performed by, a registered component.

Figure 8:
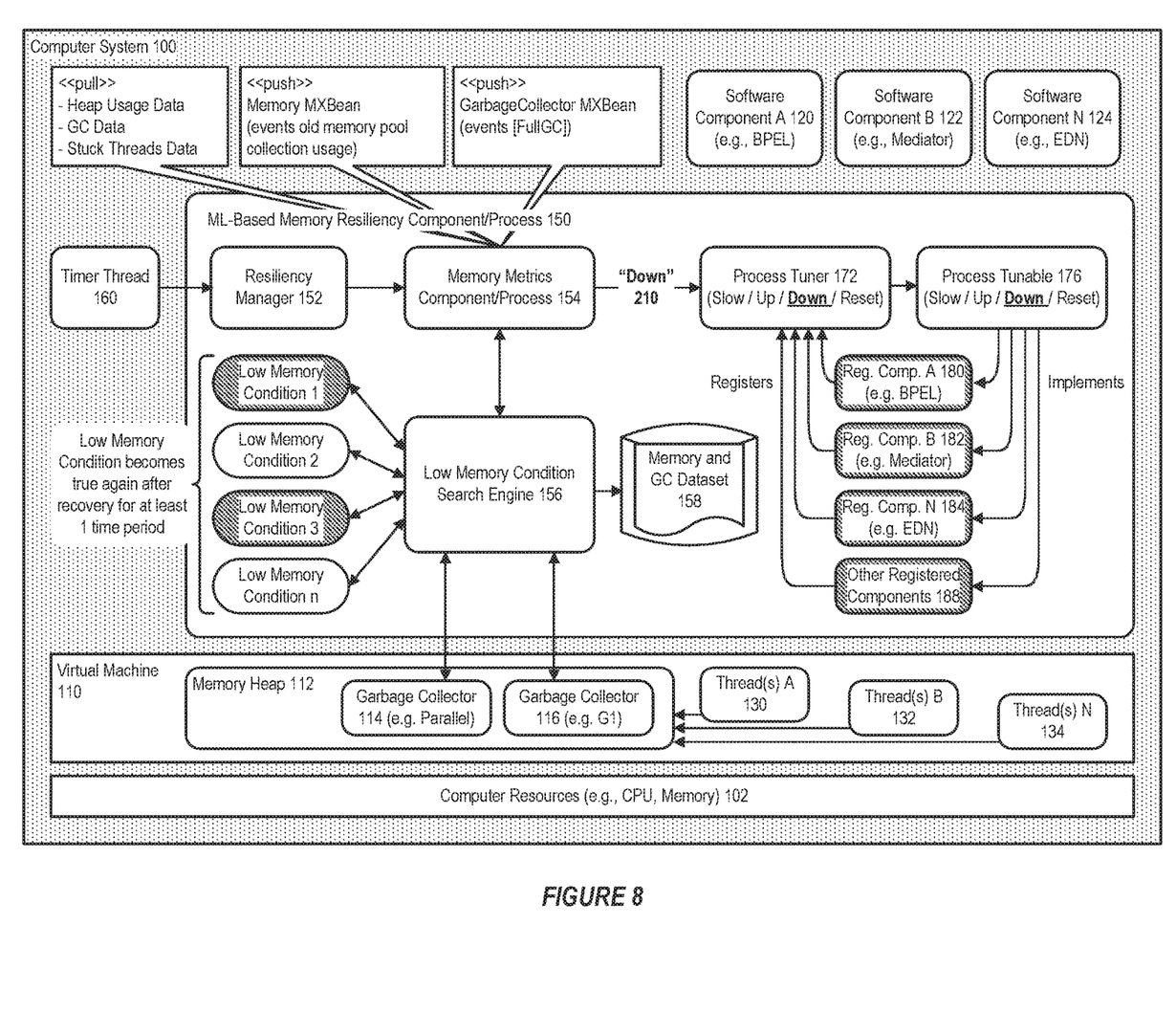
FIG. 8 further illustrates a system that provides machine learning based memory resiliency, in accordance with an embodiment.

FIG. 8 further illustrates a system that provides machine learning based memory resiliency, in accordance with an embodiment.

In accordance with an embodiment, when one or more low memory conditions become true again, after recovery for a period of time; the system can issue an instruction to reduce (down) the amount of threads associated with, and hence the processing rate performed by, a registered component.

For example, as illustrated in FIG. 8, in accordance with an embodiment, when one or more low memory conditions become true again, after recovery for a period of time (in this example, Low Memory Conditions 1 and 3, as indicated by shading); the system can issue an instruction to reduce (down) (210) the amount of threads associated with, and hence the processing rate performed by, a registered component.

Figure 9:
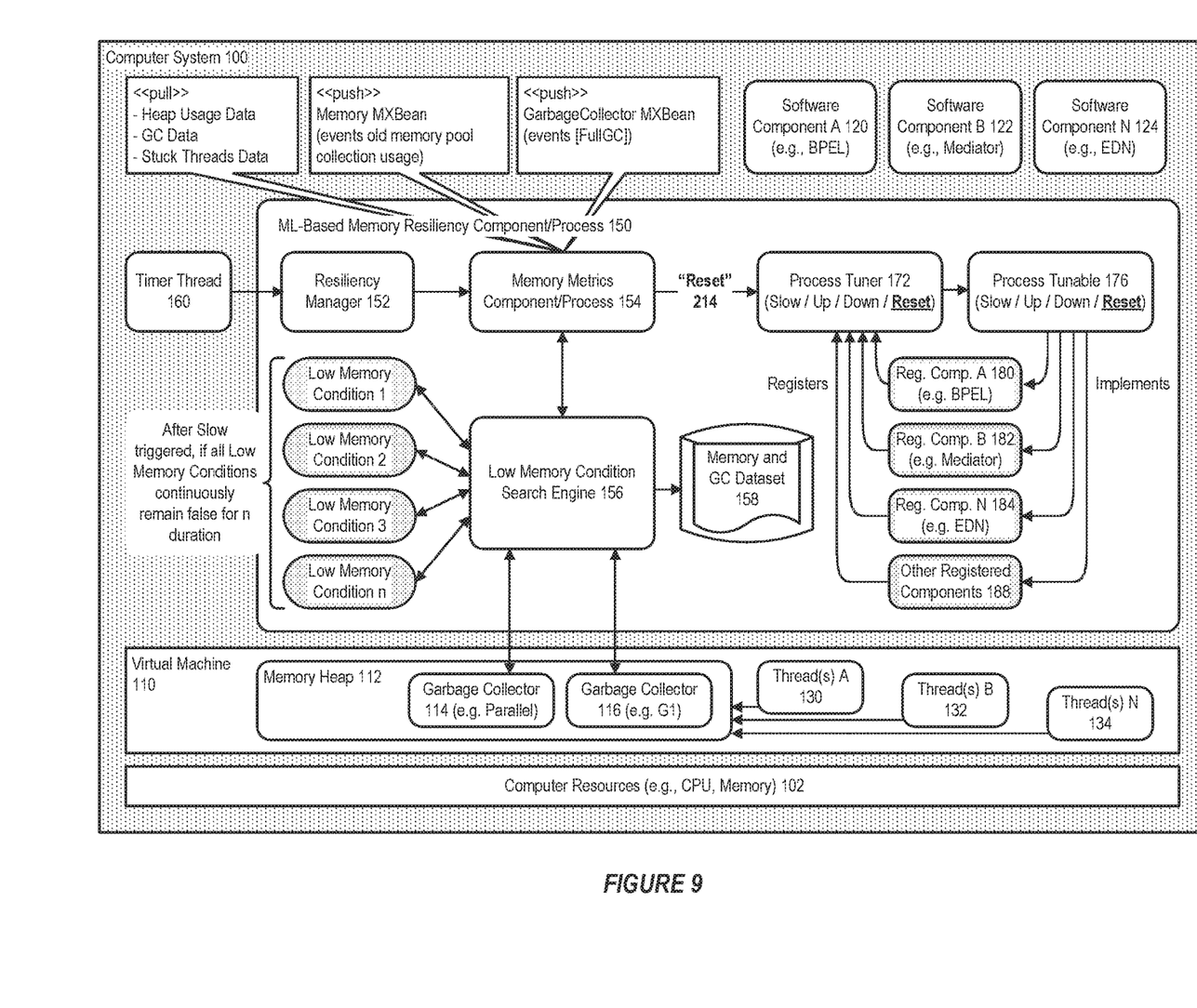
FIG. 9 further illustrates a system that provides machine learning based memory resiliency, in accordance with an embodiment.

FIG. 9 further illustrates a system that provides machine learning based memory resiliency, in accordance with an embodiment.

In accordance with an embodiment, when, after an instruction to slow the amount of threads associated with, and hence the processing rate performed by, a registered component is triggered, if all low memory conditions continuously remain false for a particular amount/period of time; then the system can issue an instruction to reset the amount of threads, and hence the processing rate performed by, a registered component.

For example, as illustrated in FIG. 9, in accordance with an embodiment, when, after an instruction to slow the amount of threads associated with, and hence the processing rate performed by, a registered component is triggered, if all low memory conditions continuously remain false for a particular amount/period of time of "n" duration (in this example, indicated by the differently-shaded Low Memory Conditions 1-n); then the system can issue an instruction to reset (214) the amount of threads, and hence the processing rate performed by, a registered component.

In accordance with an embodiment, datasets that are captured can be used for applying machine learning processes or techniques to deduce new low memory conditions.

For example, in accordance with an embodiment, a linear regression process or algorithm can be used as a machine learning process. Input variables reflecting, for example, total processor/CPU time (totalCPUTime), and total garbage collection time (totalGCTime), can be evaluated using a linear regression process. If datasets captured from multiple sources indicate that garbage collection is using 5% of processor/CPU time compared with the virtual machine (e.g., a Java virtual machine, JVM) before an out-of-memory exception, then this may indicate that a current setting or value of 7% in one of the low-memory conditions could lead to an out-of-memory exception in some cases. To safeguard against this, the setting for that low-memory condition may be changed, e.g., from a value of 7% to a value of 5%.

Datasets, input variables, and other information captured and used with machine learning processes may evolve over time, and vary depending on the particular embodiment.

For example, an embodiment may capture a message size of the request that comes in to the system, and that message size can be later used as an input variable and help in introducing new low memory conditions.

The above-described examples of machine learning processes/algorithms, datasets, input variables, and information captured, are provided for purposes of illustration, in accordance with an embodiment. In accordance with various embodiments, other types of machine learning processes/algorithms, and other types of datasets and input variables to those machine learning processes/algorithms, may be used where appropriate.

In accordance with an embodiment, additionally the system is extensible to support different low memory conditions and different registered components that require tuning of their processes, including flexibility to add/remove registered components that are adjustable or tunable and want to adjust or tune themselves based on a low memory situation. These components can provide full control over the tuning of their specific parameters, such as for example, work managers, minthreads, maxthreads, capacity constraints, or their specific thread pools.

In accordance with an embodiment, if memory pressure continues to be high, and is not controlled by tuning component processes, the system can determine likelihood of a memory leak, and restart the server.

Example Low Memory Conditions

In accordance with an embodiment, various examples of low memory conditions are provided below, for purposes of illustration. In accordance with other embodiments, other examples of low memory conditions can be supported.

Critical Notification:

In accordance with an embodiment, various examples of critical notifications can include:

Low Memory Condition 1:

On critical notification: an indication of high heap usage (old memory pool after garbage collection) AND full garbage collection reclaiming less than a value of "n" MB from old memory pool.

For example, in accordance with an embodiment, the value associated with "n" in the above example can be 50 MB.

Low Memory Condition 2:

On critical notification: an indication of high heap usage (old memory pool after garbage collection) AND full garbage collection total time is greater than a value of "n" % of total processor/CPU time used by the virtual machine.

For example, in accordance with an embodiment, the value associated with "n" in the above example can be 7%.

Low Memory Condition 3:

On critical notification: an indication of high heap usage (old memory pool after garbage collection) AND full garbage collection reclaiming less than a value "n" % of total memory before garbage collection, i.e., (beforeGC−afterGC)<("n" % of beforeGC). Above two conditions are met for a particular number of "m" times/instances, in the particular amount/period of time of "k" duration.

For example, in accordance with an embodiment, the value associated with "n" in the above example can be 5%, "m" can be 5, and "k" can be 5 minutes.

Low Memory Condition 4:

On critical notification: an indication of high heap usage (old memory pool after garbage collection) AND full garbage collection occurrence more than a particular number of "n" times/instances in "k" seconds.

For example, in accordance with an embodiment, the value associated with "n" in the above example can be 10 times/instances, and "k" can be 30 seconds.

Low Memory Condition 5:

On critical notification: an indication of high heap usage (old memory pool after garbage collection) AND current heap usage percentage (old memory pool after garbage collection) suddenly jumps a value of "n" % greater than previous heap usage percentage.

For example, in accordance with an embodiment, the value associated with "n" in the above example can be 50%.

Low Memory Condition N (Based on Datasets Captured):

In accordance with an embodiment, this condition results in slow down processing of runtime engines (concurrent processing).

Critical Notification Cleared:

In accordance with an embodiment, clearance of critical notifications will gradually increase the speed of processing of runtime engines.

Example Dataset Format

In accordance with an embodiment, an example dataset format is provided in Table 1, for purposes of illustration, which illustrates a capture and storage of information describing parallel garbage collection (ParallelGC) performance, heap usage (HeapUsage), and an indication of one or more low memory condition (lmc) as being true or false. In accordance with other embodiments, other examples or types of dataset format can be supported.

TABLE 1

[ParallelGC]:
[gcAction=end of major GC,
gcName=PS MarkSweep,
gcDuration=3337,
gcCount=18,
overload=true,
memUsageBeforeGC=6621,
memUsageAfterGC=5962,
totalCPUTime=6859740,
totalGCTime=291423,
stuckThreads=10, TABLE 1-continued

```
lmc1=false, lmc2=false, lmc3=false, lmc4=false, lmc5=false]
[HeapUsage]:
[callFrom=event,
criticalThreshold=true,
currentHeapUsagePercentage=99.99594090786607,
lastHeapUsagePercentage=99.99946050129672,
lastGCEv=2018-08-26T11:39:07.849-07:00,
stuckThreads=10,
lmc1=false, lmc2=false, lmc3=false, lmc4=true, lmc5=false]
```

In accordance with an embodiment, a dataset can be captured from different or multiple environments, for example, production environments, test environments, and/or internal environments.

In accordance with an embodiment, a logger threshold (LoggerThreshold) is the threshold which if reached then capturing a dataset will be triggered. For example, if the logger threshold percentage is greater than a heap usage critical threshold, then the system will capture a dataset.

In accordance with an embodiment, the system can apply machine learning processes or techniques on the datasets to find or otherwise determine new low memory conditions. These new low memory conditions can then be included in the memory resiliency system, and used as above.

The above examples of low memory conditions are provided for purposes of illustration. In accordance with other embodiments, other examples of low memory conditions can be supported.

Example Scenario

In accordance with an embodiment or example scenario, when a low memory conditions triggers: processes are slowed down. In this example, the low memory conditions triggers for a longer duration, and garbage collection processing time is continuously increasing more than a value of "n" % of total processor/CPU processing time by the virtual machine. In such an example situation, the system can consider it as a high likelihood of a memory leak, and trigger a server restart.

Example Method

Figure 10:
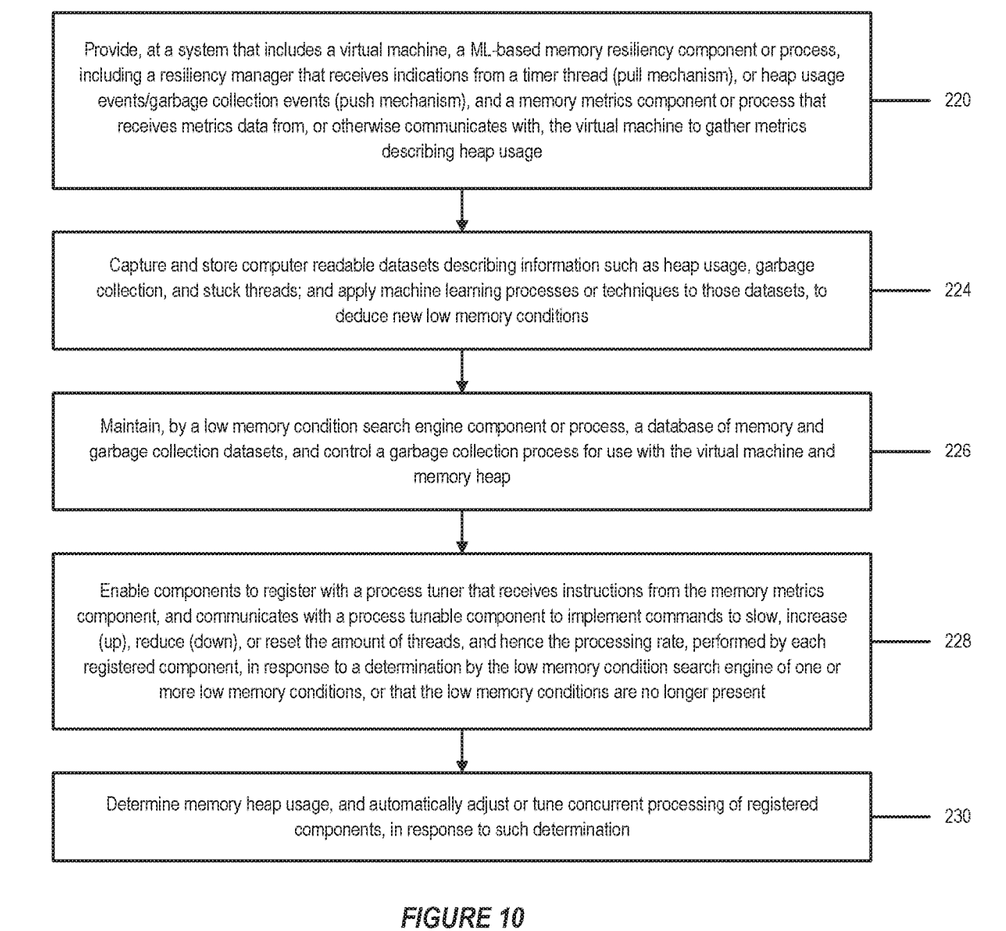
FIG. 10 illustrates a method of providing machine learning based memory resiliency, in accordance with an embodiment.

FIG. 10 illustrates a method of providing machine learning based memory resiliency, in accordance with an embodiment.

As illustrated in FIG. 10, in accordance with an embodiment, at step 220, the method comprises providing, at a system that includes a virtual machine, a ML-based memory resiliency component or process, including a resiliency manager that receives indications from a timer thread (pull mechanism), or heap usage events/garbage collection events (push mechanism), and a memory metrics component or process that receives metrics data from, or otherwise communicates with, the virtual machine to gather metrics describing heap usage.

At step 224, the memory resiliency component or process captures and stores computer readable datasets describing information such as heap usage, garbage collection, and stuck threads; and applies machine learning processes or techniques to those datasets, to deduce new low memory conditions.

At step 226, a low memory condition search engine component or process maintains a database of memory and garbage collection datasets, and controls a garbage collection process for use with the virtual machine and memory heap At step 228, the memory resiliency component or process enables components to register with a process tuner that receives instructions from the memory metrics component, and communicates with a process tunable component to implement commands to slow, increase (up), reduce (down), or reset the amount of threads, and hence the processing rate, performed by each registered component, in response to a determination by the low memory condition search engine of one or more low memory conditions, or that the low memory conditions are no longer present.

At step 230, the memory resiliency component or process determines memory heap usage, and automatically adjusts or tunes concurrent processing of registered components, in response to such determination.

For example, as described above, in accordance with an embodiment, when a first time or after a reset is triggered, any low memory condition becomes true; or any low memory condition becomes true a particular number of times/instances within a particular amount/period of time; the system can issue an instruction to slow the amount of threads associated with, and hence the processing rate performed by, a registered component.

In accordance with an embodiment, when an existing low memory condition has recovered, and none of the low memory conditions becomes true for a particular number of times/instances within a particular amount/period of time; the system can issue an instruction to increase (up) the amount of threads associated with, and hence the processing rate performed by, a registered component.

In accordance with an embodiment, when one or more low memory conditions become true again, after recovery for a period of time; the system can issue an instruction to reduce (down) the amount of threads associated with, and hence the processing rate performed by, a registered component.

In accordance with an embodiment, when, after an instruction to slow the amount of threads associated with, and hence the processing rate performed by, a registered component is triggered, if all low memory conditions continuously remain false for a particular amount/period of time; then the system can issue an instruction to reset the amount of threads, and hence the processing rate performed by, a registered component.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate computing environments that support components such as, for example, Oracle BPEL, Oracle Mediator, or Oracle EDN components, the systems and methods described herein can be used with other types of components and other types of service-oriented architecture, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing machine learning based memory resiliency within a service-oriented architecture, cloud computing, or other computing environment, comprising:
    one or more computer servers including a processor, memory, and a virtual machine for operation of one or more services, applications, or other components, wherein each of a plurality of software components that operate in association with the virtual machine can be registered for concurrent process tuning;
    wherein the system determines memory heap usage within the virtual machine based on a collected metrics data describing heap usage, and adjusts concurrent processing of registered components acccordingly, wherein:
        each component registers with a process tuner that receives instructions from a memory metrics component and communicates with a process tunable component to adjust an amount of threads, and processing rate, performed by the registered component;
        a determination is made, based on the collected metrics data, as to a presence of one or more low memory conditions; and
        in response to a determination of a low memory condition being present a particular number of instances within a particular period of time, an instruction is issued to slow the amount of threads associated with, and the processing rate performed by, the registered component; and
    wherein the system is extensible to support a plurality of low memory conditions and components that can be registered for concurrent process tuning.

2. The system of claim 1, wherein datasets describing one or more of heap usage, garbage collection, and stuck threads, are captured and stored, and machine learning processes applied to the datasets, to deduce new low memory conditions.

3. The system of claim 2, wherein the system comprises a memory resiliency component that captures and stores the datasets and applies the machine learning processes to the datasets, to deduce new low memory conditions.

4. The system of claim 1, whereupon the system determining that memory pressure continues to be high, and is not controlled by slowing component processes, the system determines a likelihood of a memory leak, and whether to restart the server.

5. The system of claim 1, wherein the system comprises a low memory condition search engine component that maintains a database of memory and garbage collection datasets, and controls a garbage collection process for use with the virtual machine and memory heap.

6. The system of claim 1, wherein a memory resiliency component enables components to register with a process tuner that receives instructions from a memory metrics component, and communicates with a process tunable component to implement commands to one of increase, reduce, or reset an amount of threads, and processing rate, performed by each registered component, in response to a determination of one or more low memory conditions, or that the low memory conditions are no longer present.

7. The system of claim 1, wherein a memory resiliency component determines the memory heap usage based on the collected metrics via one or more push and/or pull mechanisms.

8. The system of claim 1, wherein the system determines memory heap usage within the virtual machine based on the collected metrics via one or more push and/or pull communications of data, including data describing one or more of heap usage, garbage collection, and stuck threads, and automatically adjusts concurrent processing of registered components, in response to such determination.

9. A method for providing machine learning based memory resiliency within a service-oriented architecture, cloud computing, or other computing environment, comprising:
    providing one or more computer servers including a processor, memory, and a virtual machine for operation of one or more services, applications, or other components, wherein each of a plurality of software components that operate in association with the virtual machine can be registered for concurrent process tuning;
    determining memory heap usage within the virtual machine based on a collected metrics data describing heap usage, and adjusting or tuning concurrent processing of registered components acccordingly, wherein:
        each component registers with a process tuner that receives instructions from a memory metrics component and communicates with a process tunable component to adjust an amount of threads, and processing rate, performed by the registered component;
        a determination is made, based on the collected metrics data, as to a presence of one or more low memory conditions; and
        in response to a determination of a low memory condition being present a particular number of instances within a particular period of time, an instruction is issued to slow the amount of threads associated with, and the processing rate performed by, the registered component; and
    wherein the method supports a plurality of low memory conditions and components that register for concurrent process tuning.

10. The method of claim 9, wherein datasets describing one or more of heap usage, garbage collection, and stuck threads, are captured and stored, and machine learning processes applied to the datasets, to deduce new low memory conditions.

11. The method of claim 10, wherein a memory resiliency process captures and stores the datasets and applies the machine learning processes to the datasets, to deduce new low memory conditions.

12. The method of claim 9, whereupon determining that memory pressure continues to be high, and is not controlled by slowing component processes, a determination is made as to a likelihood of a memory leak, and whether to restart the server.

13. The method of claim 9, wherein a low memory condition search engine process maintains a database of memory and garbage collection datasets, and controls a garbage collection process for use with the virtual machine and memory heap.

14. The method of claim 9, wherein a memory resiliency process enables components to register with a process tuner that receives instructions from a memory metrics component, and communicates with a process tunable component to implement commands to one of increase, reduce, or reset an amount of threads, and processing rate, performed by each registered component, in response to a determination of one or more low memory conditions, or that the low memory conditions are no longer present.

15. The method of claim 9, wherein a memory resiliency process determines the memory heap usage based on the collected metrics via one or more push and/or pull mechanisms.

16. The method of claim 9, wherein the memory heap usage within the virtual machine based on the collected metrics is determined via one or more push and/or pull communications of data, including data describing one or more of heap usage, garbage collection, and stuck threads, and automatically adjusts concurrent processing of registered components, in response to such determination.

17. A non-transitory computer readable storage medium, including instructions stored thereon which when read and executed by one or more computers cause the one or more computers to perform a method comprising:

providing one or more computer servers including a processor, memory, and a virtual machine for operation of one or more services, applications, or other components, wherein each of a plurality of software components that operate in association with the virtual machine can be registered for concurrent process tuning;

determining memory heap usage within the virtual machine based on a collected metrics data describing heap usage, and adjusting or tuning concurrent processing of registered components acccordingly, wherein:

each component registers with a process tuner that receives instructions from a memory metrics component and communicates with a process tunable component to adjust an amount of threads, and processing rate, performed by the registered component;

a determination is made, based on the collected metrics data, as to a presence of one or more low memory conditions; and in response to a determination of a low memory condition being present a particular number of instances within a particular period of time, an instruction is issued to slow the amount of threads associated with, and the processing rate performed by, the registered component; and wherein the method supports a plurality of low memory conditions and components that register for concurrent process tuning.

18. The non-transitory computer readable storage medium of claim 17, wherein a memory resiliency process enables components to register with a process tuner that receives instructions from a memory metrics component, and communicates with a process tunable component to implement commands to one of increase, reduce, or reset an amount of threads, and processing rate, performed by each registered component, in response to a determination of one or more low memory conditions, or that the low memory conditions are no longer present.one or more low memory conditions, or that the low memory conditions are no longer present.

19. The non-transitory computer readable storage medium of claim 17, wherein a memory resiliency process determines the memory heap usage based on the collected metrics via one or more push and/or pull mechanisms.

20. The non-transitory computer readable storage medium of claim 17, wherein the memory heap usage within the virtual machine based on the collected metrics is determined via one or more push and/or pull communications of data, including data describing one or more of heap usage, garbage collection, and stuck threads, and automatically adjusts concurrent processing of registered components, in response to such determination.

\* \* \* \* \*

UNITED STATES PATENT AND TRADEMARK OFFICE
CERTIFICATE OF CORRECTION

PATENT NO. : 11,068,375 B2
APPLICATION NO. : 16/373238
DATED : July 20, 2021
INVENTOR(S) : Kotecha et al.

It is certified that error appears in the above-identified patent and that said Letters Patent is hereby corrected as shown below:

In the Specification

In Column 5, Line 31, delete "components)," and insert -- components, --, therefor.

In Column 8, Line 52, delete "(Imc)" and insert -- (lmc) --, therefor.

In Column 8, Line 58, delete "[ParalleIGC]:" and insert -- [ParallelGC]: --, therefor.

In Column 9, Line 64, delete "heap" and insert -- heap. --, therefor.

In the Claims

In Column 11, Line 31, in Claim 1, delete "acccordingly," and insert -- accordingly, --, therefor.

In Column 12, Line 37, in Claim 9, delete "acccordingly," and insert -- accordingly, --, therefor.

In Column 13, Line 42, in Claim 17, delete "acccordingly," and insert -- accordingly, --, therefor.

In Column 14, Lines 29-30, in Claim 18, after "present." delete "one or more low memory conditions, or that the low memory conditions are no longer present.".

Signed and Sealed this
Fourth Day of January, 2022

Drew Hirshfeld
*Performing the Functions and Duties of the
Under Secretary of Commerce for Intellectual Property and
Director of the United States Patent and Trademark Office*